United States Patent [19]

Katz

[11] 4,293,875

[45] Oct. 6, 1981

[54] WIDE BANDWIDTH VIDEO AMPLIFIER

[75] Inventor: Bernard R. Katz, Rockaway, N.J.

[73] Assignee: Telegram Communications Corp., Denville, N.J.

[21] Appl. No.: 109,195

[22] Filed: Jan. 3, 1980

[51] Int. Cl.³ .............................................. H04N 5/14
[52] U.S. Cl. ................................... 358/184; 330/263; 330/268; 330/267
[58] Field of Search ................. 358/39, 160, 188, 184, 358/21 R; 315/379, 383; 330/291, 290, 296, 298, 254, 260, 273, 263, 265, 267, 268

[56] References Cited

U.S. PATENT DOCUMENTS

3,499,104  3/1970  Austin .................................. 358/184
4,035,840  7/1977  Teuling .............................. 358/184
4,197,558  4/1980  Rutishauser ........................ 358/184

*Primary Examiner*—Marc E. Bookbinder
*Assistant Examiner*—Michael A. Masinick
*Attorney, Agent, or Firm*—Eugene Lieberstein

[57] ABSTRACT

The video amplifier circuit comprises a complementary symmetrical arrangement of a first and second solid state transistor element with the video input source coupled through a level shifting circuit to the first element and through a DC level shifting circuit to the second element and with means provided for operating each element in a clamped mode approaching saturation. Additional circuit modifications include means for modulating the video input signal with a high frequency signal to cause continuous gray scale variation.

11 Claims, 9 Drawing Figures

WIDE BANDWIDTH VIDEO AMPLIFIER

This invention relates to a wide bandwidth video amplifier for an alpha-numeric character display system utilizing a cathode ray tube.

As known to those skilled in the art, video amplifiers are conventionally used to provide the required driving voltage for the control grid or cathode of a cathode ray tube (CRT) in a television receiver. Television signals are continuously varying analog signals requiring the amplifying circuit transfer function to be linear or continuous in predetermined fashion, in order to provide gray scale reproduction. Known linear video amplifiers possessing the bandwidth required for short rise times generally require a substantial number of gain stages due to techniques utilized for frequency compensation. Such techniques include the use of low frequency emitter or cathode circuit degeneration and frequency dependent collector or plate load impedances. Accordingly, such video amplifiers are, in general, complex and relatively expensive.

It has been discovered in accordance with the present invention that when the display is limited to alpha-numeric information or other information not primarily requiring gray scale rendition, a simplified wide bandwidth amplifier circuit using complementary symmetry circuit design may be utilized to provide the required drive for the cathode ray tube provided it is operated in a clamped mode, approaching saturation.

This eliminates the need for degenerative and peaking techniques required to secure bandwidth in analog video amplifiers. Although the complementary symmetry configuration has been utilized for linear video amplifiers, defects relating to noise susceptibility and other factors are inherent in the linear implementation. This subject is addressed on a comparative basis in due course herein.

In its elemental form, the video amplifier of the present invention is characterized by a complementary transistor amplifying circuit configuration with each transistor of the complementary pair arranged to respond to separate predetermined digital logic levels by means of AC level shifting between transistors. A modification of the video amplifying circuit of the present invention will permit the display of at least several different discrete shades of gray. A further embodiment of the present invention involving additional circuitry will permit the video amplifying circuit to display continuous gray scale.

It is therefore the principal object of the present invention to provide a low cost wide bandwidth video amplifier circuit for driving a cathode ray tube or other device which will permit reproduction of several discrete gray scale shades.

It is an even further object of the present invention to provide a video amplifier circuit for driving a cathode ray tube which will permit continuous gray scale rendition.

Other objects and advantages of the present invention will become apparent from the following detailed description of the invention when read in conjunction with the accompanying drawings of which:

Figure 1:
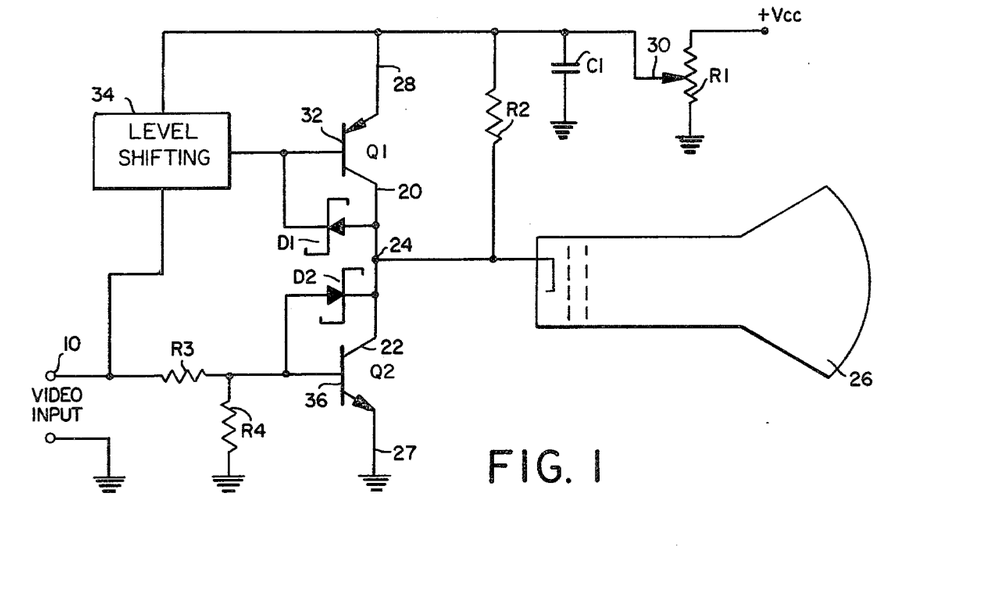
FIG. 1 is a circuit diagram of the video amplifier of the present invention in its most elemental form.

FIG. 1 illustrates the video amplifier circuit configuration of the present invention where continuous gray scale rendition is not required. Transistor Q1 forms a complementary pair with transistor Q2 with their collector terminals 20 and 22 connected in common at the output junction point 24. The emitter terminal 27 of transistor Q2 is connected to ground potential while the emitter terminal 28 of transistor Q1 is connected to a wiper arm 30 of a potentiometer R1. A positive supply source Vcc on the order of 40–60 volts, for example, is connected across the potentiometer R1. The output junction 24 is shown connected to the cathode of a conventional cathode ray tube 26, although grid drive may alternatively be used. If cathode drive is employed within the embodiments shown in FIGS. 2 and 3, a resistor R2 is interposed between the output junction point 24 and the emitter terminal 28 of transistor Q1 to keep the output high to assure a blank screen on the CRT 26 during the absence of an input signal. A capacitor C1 is connected between the wiper arm 30 and ground potential for bypassing the DC supply Vcc at video frequencies.

The base 32 of transistor Q1 is coupled to the video input terminal 10 through a level shifting circuit 34. A shottky diode D1 couples the base 32 to the collector terminal 20 of transistor Q1 to provide anti-saturation clamping for transistor Q1. The base terminal 36 of transistor Q2 is connected to the video input terminal 10 through a pair of resistors R3 and R4 which operate to shift the input level to match the drive requirements of transistor Q2. A second shottky diode D2 couples the base 36 to the collector terminal 22 of transistor Q2 to provide anti-saturation clamping for transistor Q2. The shottky diodes D1 and D2 prevent transistors Q1 and Q2 from being driven deep into saturation which would otherwise result in substantial storage time lags during turnoff. It will be recognized by those skilled in the art that anti-saturation clamping is not required if field effect transistors (FET devices) are used in lieu of bipolar transistors, as the former do not suffer from carrier recombination effects as do the latter.

In operation, each of the transistors Q1 and Q2 are alternately driven nearly into saturation in response to digital logic video input signals applied to the input terminal 10. The video input signals may be representative of alpha-numeric characters. It is preferred for proper operation in accordance with the present invention that each transistor be enabled on alternate input levels so that there is substantially no overlapping period when both transistors are on. As a result of avoidance of saturated operation, bandwidths of up to 100

MHz and greater are attainable. Moreover, operation of each transistor into a nearly saturated condition results in an output video signal swing which closely approximates the full DC power supply voltage between the emitters 27 and 28 respectively. Adjustment of potentiometer R1 therefore may provide contrast control by variation of the DC supply level applied to the amplifier.

Figure 2:
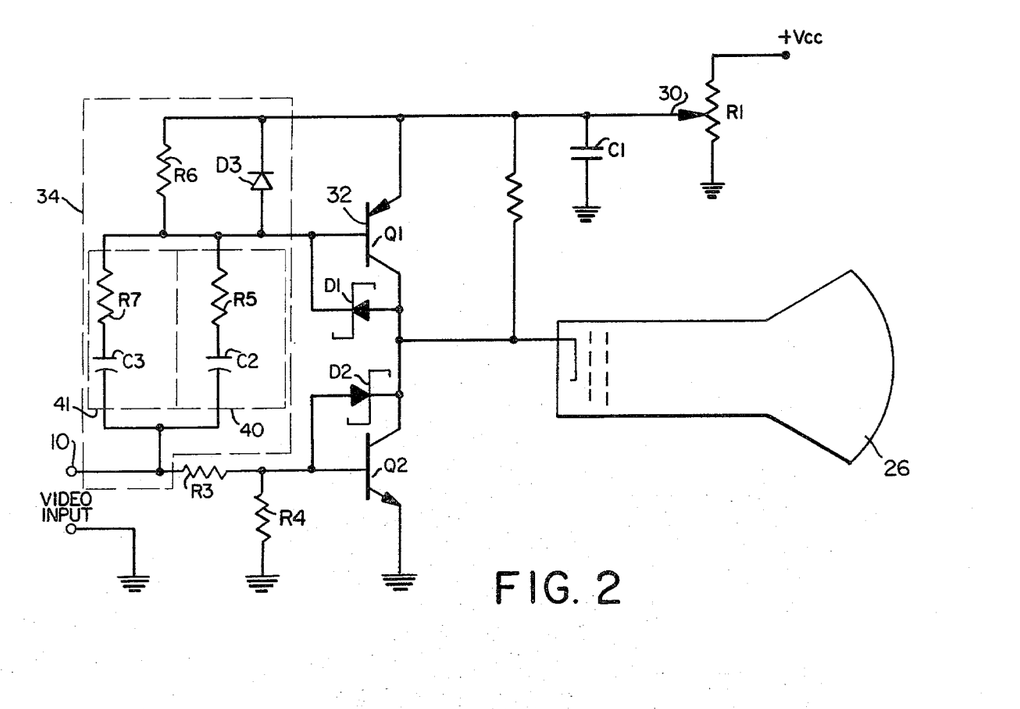
FIG. 2 is a circuit diagram of one embodiment of the video amplifier circuit of FIG. 1.

FIG. 2 is a reproduction of the video amplifier circuit of FIG. 1 showing a preferred AC coupling arrangement for the level shifting circuit 34. Resistors R5 and R6 provide input shifting to match the drive requirements of transistor Q1, as resistors R3 and R4 do for transistor Q2. The base 32 of transistor Q1 is AC coupled through a combination of two networks 40 and 41 to the video input terminal 10. The network 40 is composed of the resistor R5 in series with a capacitor C2 whereas the network 41 is composed of a resistor R7 in combination with the capacitor C3. The time constant of the circuit combination of C2 and R5 should be at least several orders of magnitude greater than the time constant of the circuit combination of C3 and R7. Preferably the network 40 should have a relatively long time constant selected to prevent change in base drive to the transistor Q1 over a period of at least one frame of the display for the cathode ray tube 26. A typical time constant for circuit 40 should be in the order of, for example, 1/20 second. On the other hand, the network 41 should have a very short time constant in the nanosecond range to permit transistor Q1 to reinitialize, i.e., to function for the first displayed character following blank screen conditions. The diode D3 provides DC restoration for the base drive to transistor Q1 such that no net charge appears on capacitor C2 from Q1 base emitter junction rectification. The resistors R5 and R6 and capacitor C2 should be chosen such that no appreciable rolloff occurs at the lowest frequency of interest.

Figure 3:
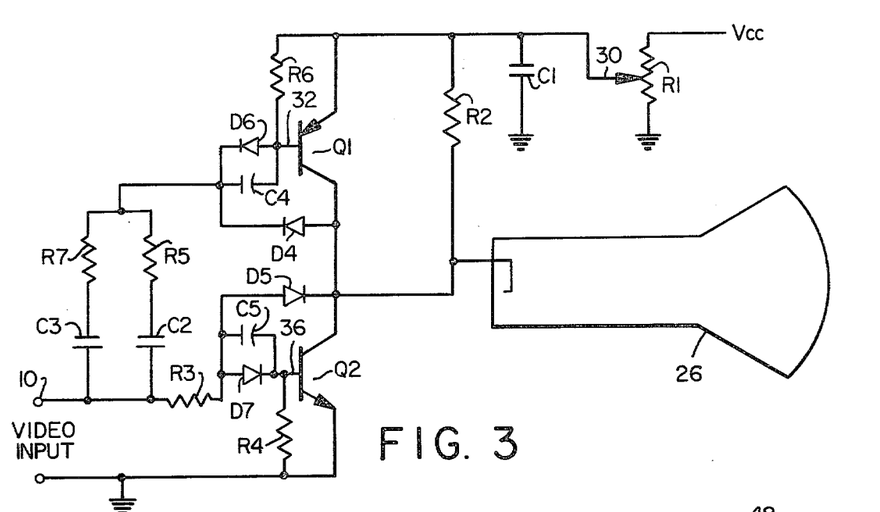
FIG. 3 is an alternative circuit diagram for the embodiment of the video amplifier shown in FIG. 2.

Another alternative for the circuit configuration shown in FIG. 2 is illustrated in FIG. 3 with corresponding elements having the same reference character designations. In FIG. 3, a diode circuit is used in place of the Shottky diodes D1 and D2 of FIG. 2. Diodes D4 and D5 perform the function of the Shottky diodes D1 and D2 respectively. In this case, however, additional diodes D6 and D7 are necessary to artificially increase the base-emitter voltage of transistors Q1 and Q2 such that diodes D4 and D5 may effectively provide anti-saturation clamping. Capacitors C4 and C5 provide low impedance AC paths to the base terminals 32, 36 of transistors Q1 and Q2 to prevent D6 and D7 from performing any function other than providing a simple DC offset.

Figure 4:
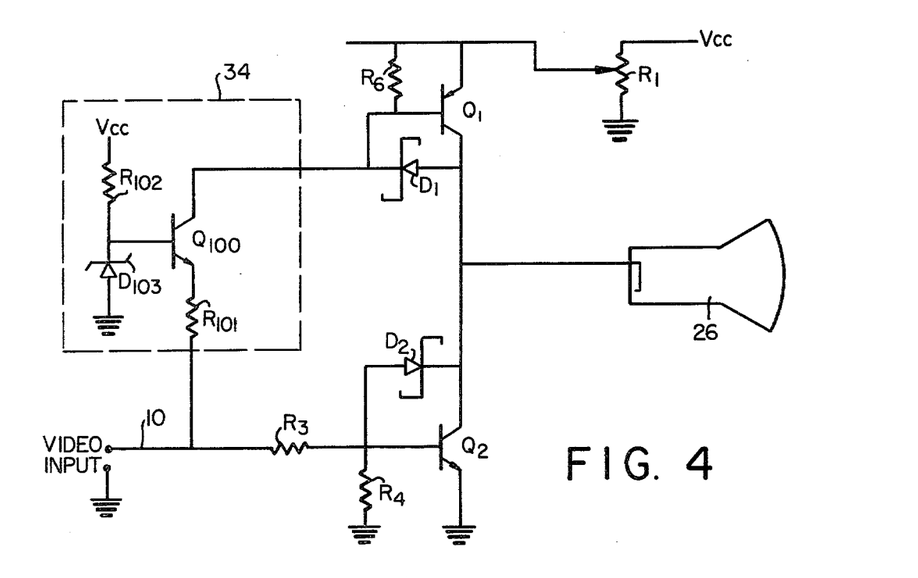
FIG. 4 is a circuit diagram of the preferred embodiment of the video amplifier of FIG. 1.

The circuit configuration for the preferred video amplifier circuit of FIG. 1 using DC level shifting means 35 for the base drive for transistor Q1 is shown in FIG. 4. Transistor Q100 is operated as a common base amplifier, whose base voltage is determined by zener diode D100 and pullup resistor R102. Alternatively, a resistive voltage divider may be substituted for resistor R102 and Zener diode D100.

During periods when transistor Q1 is conducting, corresponding to a logical 1 or high state video input, transistor Q100 collector current is determined by resistor R101, Zener diode D100 voltage, and the base-emitter voltage drop of transistor Q100. Zener diode D100 voltage is selected such that transistor Q100 base-emitter junction is reverse biased when transistor Q1 is to be in a non-conducting state. Resistor R101 is selected to insure adequate base drive for transistor Q1 when the latter is to be in a conducting state. When the video input is at a logical high level, current flow through resistor R101 ceases, as the base-emitter junction of transistor Q100 becomes reverse biased. As a result of base drive removal, Q1 therefore enters the non-conducting state.

In most respects, operation of the circuitry shown in FIG. 4 is similar to that of circuitry shown in FIG. 2. However, resistor R2 is not required, and, more importantly, susceptibility to noise present on the DC supply line, Vcc, is reduced. Such noise could affect the state of conduction of transistor Q1 in FIGS. 2 and 3, as capacitors C2 and C3 represent low impedances above certain frequencies.

The subject noise susceptibility is, however, a far greater problem with analog video amplifiers employing complementary symmetry techniques, as the PNP transistor (equivalent to that designated as Q1 herein) is operated in the linear domain, so that not even the base-emitter voltage drop serves a threshold function. An example of the same is shown in U.S. Pat. No. 4,035,840.

An incidental burdensome requirement of linear (or continuous) complementary symmetry amplifiers also appears in the above reference, that being the need of providing feedback from the amplifier output to a previous stage. The reason for this requirement is known to those skilled in the art, and derives from the inherently high values of transistor collector resistance, and hence the inability to drive the output to a given voltage without feedback. The feedback requirement is absent from any embodiment of the instant invention, as is obvious from foregoing descriptions of the invention.

Figure 5:
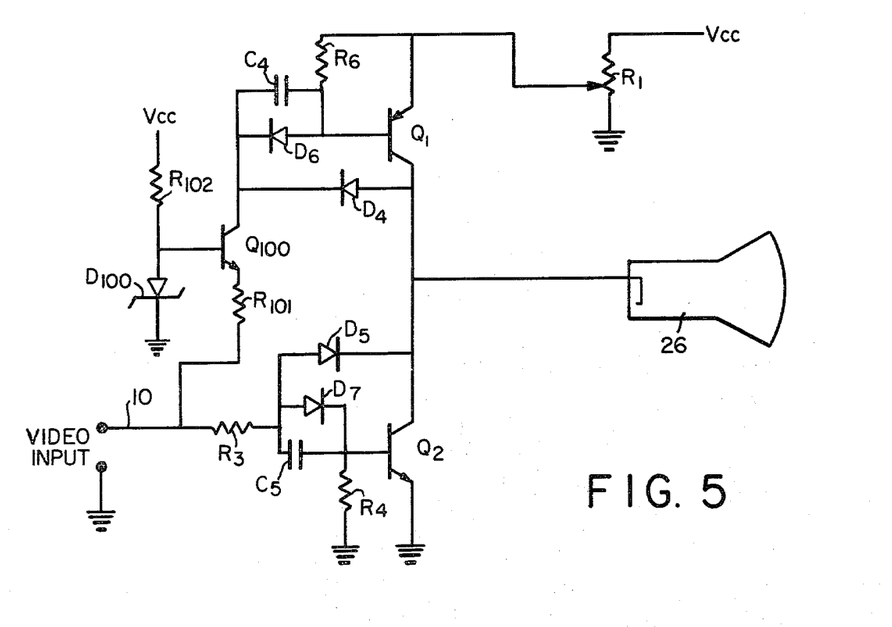
FIG. 5 is an alternative circuit diagram for the embodiment of the video amplifier shown in FIG. 4.

Another alternative for the circuit configuration shown in FIG. 4 is illustrated in FIG. 5 with corresponding elements having the same reference character designations. In FIG. 5 a diode circuit is used in place of the Shottky diodes D1 and D2 of FIG. 4. Diodes D4 and D5 perform the function of the Shottky diodes D1 and D2 respectively. In this case, however, additional diodes D6 and D7 are necessary to artificially increase the base-emitter voltage of transistors Q1 and Q2 such that diodes D4 and D5 may effectively provide anti-saturation clamping. Capacitors C4 and C5 provide low impedance AC paths to the base terminals 32, 36 of transistors Q1 and Q2 to prevent D6 and D7 from performing any function other than providing a simple DC offset.

Figure 6:
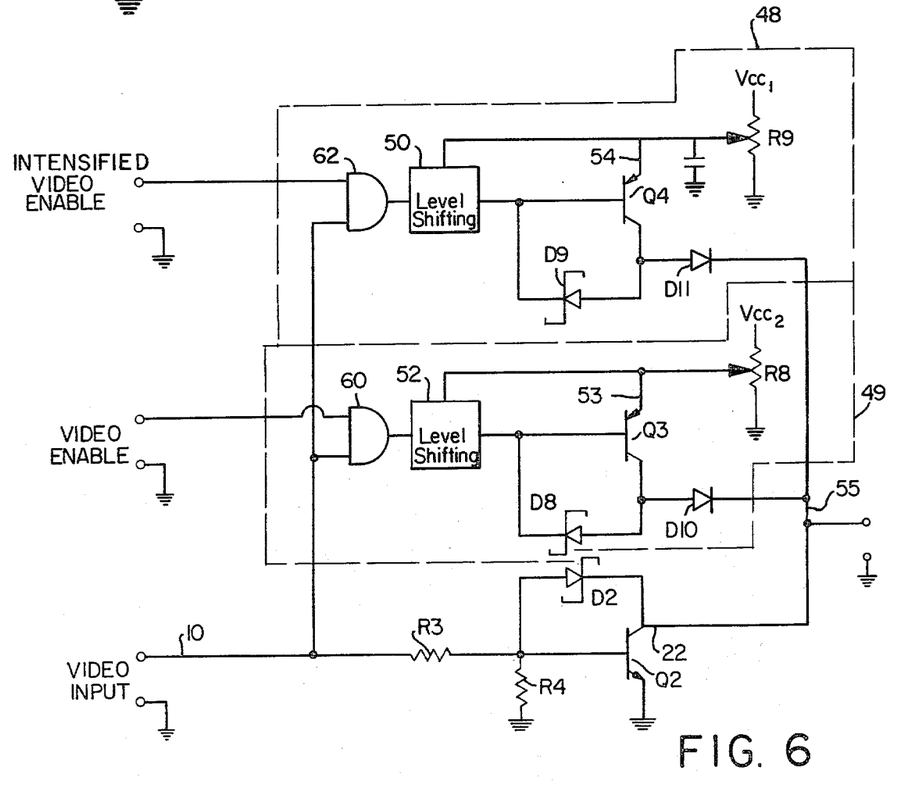
FIG. 6 is a circuit diagram of another embodiment of the video amplifier of FIG. 1 for reproducing discrete gray scale shades.

FIG. 6 is a modification of the video amplifier circuit of the present invention for reproducing distinct shades of gray. The different shades of gray are denoted by different power supply voltage levels. In FIG. 6 two separate shades of gray are possible with each represented by the voltage source levels $Vcc_1$ and $Vcc_2$. It should be apparent that any number of additional gray scale shades may be provided by including additional power supply voltage source levels. Each voltage source level is associated with its own voltage level circuit which includes either an AC or DC level shifting circuit. The voltage level circuit 48 includes the voltage source level $Vcc_1$ and the AC level shifting circuit 50 whereas the voltage level circuit 49 includes voltage level $Vcc_2$ and the AC level shifting circuit 52. The voltage level circuits 48 and 49 are connected in tandem with transistors Q3 and Q4 arranged in complementary symmetry with transistor Q2. The transistor Q2 and the DC impedance matching network of resistors R3 and R4 is identical to that in FIG. 1. The emitters 53 and 54 of transistors Q3 and Q4 are connected to the respective potential source levels $V_{cc2}$ and $V_{cc1}$ through variable potentiometers R8 and R9 respectively. Potentiometers R8 and R9 provide the DC contrast control as explained earlier in connection with potentiometer R1 of FIG. 1. A Shottky diode D8 and D9 is placed across the base to collector junction of each transistor Q3 and Q4 to provide the required anti-saturation clamping for transistors Q3 and Q4 respectively. The Shottky diode D2 provides the anti-saturation clamping for transistor Q2 as explained hereinbefore in connection with FIGS. 1, 2 and 4. Diode clamping means shown in FIGS. 3 and 5 may be utilized in lieu of Shottky diodes.

The output of the circuit is taken at the junction point 55 which is connected in common to the collector 22 of transistor Q2 and to the collectors of each of the transistors Q3 and Q4 through the isolation diodes D10 and D11 respectively.

The level shifting circuits 50 and 52 are equivalent in circuitry and function to the logic level shifting circuit 34 of FIG. 1. A logic level video input is applied to terminal 10 relative to ground potential in a similar manner to that of FIG. 1. The logic level video input represents alpha-numeric character or other information.

A predetermined gray shade is selected by enabling one of the gate means 60 and 62. This is accomplished by applying one of the signals identified as the normal video enable or the intensified video enable from a source (not shown). The gate means 60 and 62 may represent any conventional logic gating circuit such as an And gate. The normal or intensified video enable signals must be externally generated to control the selection. The manner by which such signals are generated do not form part of the present invention. The total voltage at the circuit output across terminal 55 relative to ground potential will be a function of which transistor Q3 and Q4 is turned on at any given time.

Figure 7:
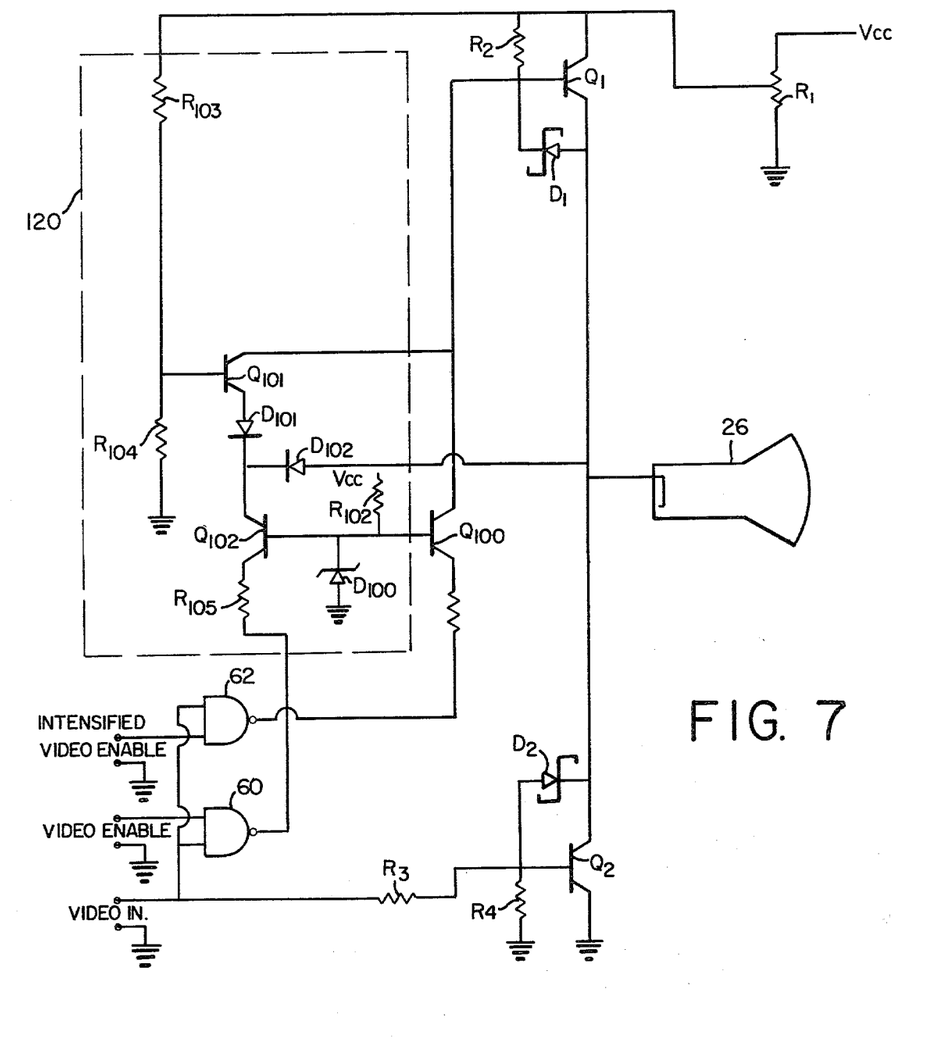
FIG. 7 is a circuit diagram of an alternate embodiment of the video amplifier of FIG. 1 for reproducing discrete gray scale shades.

FIG. 7 is yet another modification of the instant invention for reproducing distinct shades of gray. All circuit elements except for those contained within level shifting circuit 120, have been described previously. Gate means 62 provides a signal to resistor R101 when intensified video is desired; in this mode of operation where level shifting circuit 120 is not used, circuitry of FIG. 7 operates identically to circuitry shown in FIGS. 4 and 5.

When normal video contrast is desired, the output of gate means 60 attains a low voltage state causing current flow through resistor R105. Transistor Q102 serves a function similar to that of transistor Q100 in that constant current sinking is generated at its collector terminal. Current flow through diode D101 is applied to the emitter terminal of transistor Q101; essentially the same current is applied to the base of transistor Q1 as transistor Q101 is utilized in the common base configuration. Transistor Q1, however, will not approach saturation conditions as diode D102 provides base drive clamping for transistor Q1 at a voltage equal to transistor Q101 base voltage less the voltage drop caused by diode D101 and transistor Q101 emitter-base junction.

It may be stated therefore that under conditions of normal video operation, the total voltage swing applied to the control element of cathode ray tube 26 is a portion of the voltage swing provided under intensified video conditions, that portion being approximately equal to the voltage division ratio obtained by selection of resistors R103 and R104; or:

(R104)/(R103+R104.)

Diode D102 may be a standard silicon diode; a Shottky diode is not necessary, as low forward voltage drop is not required. Diode clamping networks described in conjunction with FIGS. 3 and 5 may be used in lieu of Shottky diodes D1 and D2.

Level shifting circuit 120 and the associated gate means may be duplicated a number of times if required, with alteration to the voltage division ratio implemented by resistors R103 and R104, in order to secure multiple discrete gray scale shades.

Figure 8:
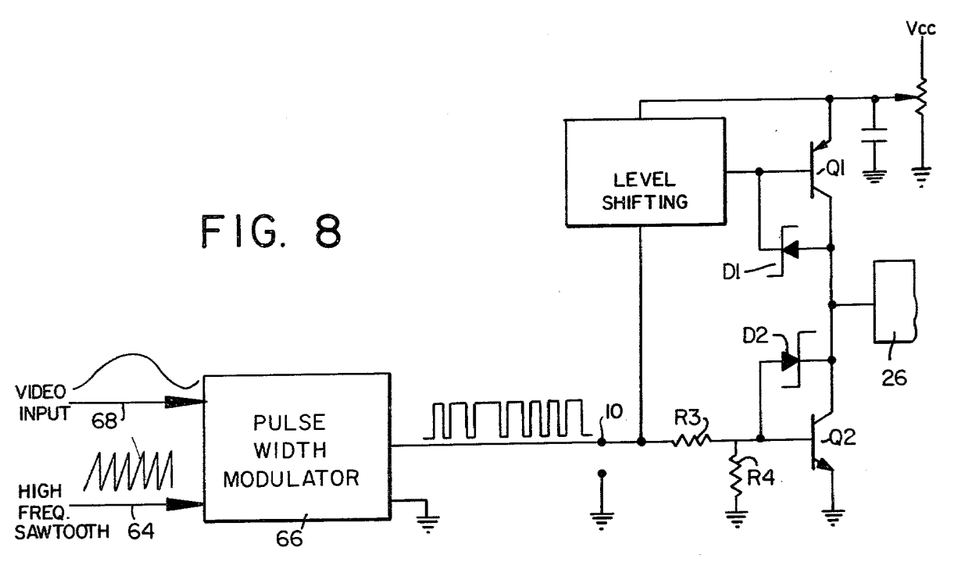
FIG. 8 is a circuit diagram of yet another embodiment of the video amplifier of FIG. 1 for continuous gray scale reproduction.
Figure 9:
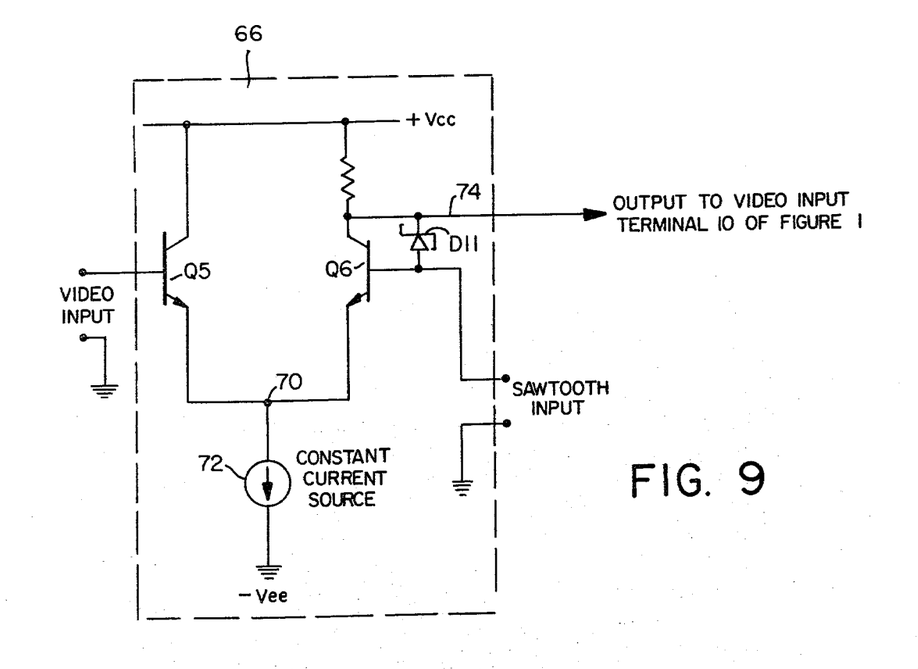
FIG. 9 is a circuit schematic of the pulse width modulator of FIG. 8.

FIG. 1 may be used for continuous gray scale reproduction by including additional circuitry as illutrated in FIG. 8. A high frequency sawtooth input 64 is applied as one input to a pulse width modulator 66. The high frequency sawtooth may be obtained from any conventional ramp generator. The pulse width modulator 66 modulates the sawtooth input with a video input 68 such that the average signal level is altered by manipulating the output pulse width as shown in a manner well-known to those skilled in the art. The effect of the pulse width modulation is to vary the dot width displayed on the CRT 26 effectively causing continuous gray scale variations in a manner not unlike that employed in half-tone lithography. The pulse repetition frequency may be made high enough so that no scan line discontinuities are obvious.

A conventional high gain differential amplifier with anti-saturation clamping provided by a Shottky diode D11 as shown in FIG. 6 may be used for the pulse width modulator 66 of FIG. 5. The differential amplifier is represented by push pull arrangement of transistors Q5 and Q6 with a common emitter terminal 70 connected through a constant current source 72 to a negative potential Vee. The constant current source 72 may be of any conventional design as is well-known in the art. The output at terminal 74 is applied to the video input terminal 10 of FIG. 1. The differential amplifier is overdriven to alternatively turn transistors Q5 and Q6 on to provide the output pulse train as shown in FIG. 5. The Shottky diode D11 prevents either transistor Q5 or Q6 from being driven deep into saturation.

What is claimed is:

1. A wide bandwidth video amplifier circuit for driving a CRT or other electro-optical device in response to alpha-numeric or other digital video signal input information comprising:

first and second solid state transistor amplifier elements connected in a complementary symmetrical configuration with a common collector output terminal adapted for connection to the cathode or grid of the cathode ray tube and with each transistor element having a base and emitter terminal;

level shifting circuit means coupling the base terminal of said first amplifier element to the video signal input such that said first amplifier element is enabled when said second amplifier element is disabled and vice versa;

DC shift means coupling the base terminal of said second amplifier element to the video signal input;

means for clamping the base to collector terminals of said first and second amplifier elements to prevent said elements from being driven deep into saturation in response to the video signal input;

a source of DC potential;

contrast control means coupling said source of DC potential across said first and second amplifier elements; and capacitor means for bypassing said source of DC potential at video frequencies.

2. An amplifier circuit as claimed in claim 1 wherein said level shifting circuit means comprises a first and second AC coupled circuit network each composed of a resistor and capacitor series circuit with the first network having a relatively long time constant of at least several orders of magnitude greater than the time constant of the second circuit network.

3. An amplifier circuit as claimed in claim 2 wherein said clamping means comprises a Shottky diode.

4. An amplifier circuit as claimed in claim 2 wherein the clamping means for each transistor element comprises a pair of diodes with one arranged to increase the effective transistor base to emitter voltage and the other arranged to clamp the collector of each transistor to the increased base to emitter voltage and a capacitor for each pair of diodes to provide a low impedance AC path to each base terminal of each transistor element respectively.

5. An amplifier circuit as claimed in claim 1 wherein said level shifting circuit means comprises a third transistor directly coupled between said video input and the base of said first transistor amplifier element.

6. An amplifier circuit as claimed in claim 5 wherein said third transistor is connected in a common base configuration with the base connected to a Zener diode for establishing a predetermined base reference potential.

7. An amplifier circuit as claimed in claim 5 wherein said clamping means comprises a Shottky diode.

8. An amplifier circuit as claimed in claim 5 wherein the clamping means for each transistor element comprises a pair of diodes with one arranged to increase the effective transistor base to emitter voltage and the other arranged to clamp the collector of each transistor to the increased base to emitter voltage and a capacitor for each pair of diodes to provide a low impedance AC path to each base terminal of each transistor element respectively.

9. An amplifier circuit as defined in claim 1 wherein said first transistor amplifier element and said level shifting circuit means represents in conjunction with said source of DC potential a first voltage level circuit defining a first shade of gray upon said cathode ray tube and further comprising a second voltage level circuit for displaying a second shade of gray upon said cathode ray tube, said second voltage level circuit including a second source of DC potential, and a third transistor amplifier element connected in a complementary symmetrical configuration with said first and second transistor amplifier elements with the collector terminal of said second transistor element connected in common with the collector terminals of said first and third transistor elements through diode means, a second level shifting means for said second voltage level circuit and gate means for enabling said first or second voltage level circuits in response to a predetermined enable signal.

10. An amplifier circuit as defined in claim 1 wherein said level shifting means coupling said video input to said first amplifier element comprises:
 a first DC coupled circuit means for enabling the voltage level at said common collector output terminal to swing from a first level of potential when said second amplifier element is enabled to a second voltage level of potential when said first amplifier element is enabled;
 a second DC coupled circuit means for enabling the voltage level at said common collector output terminal to swing from said first level of potential when said second amplifier element is enabled to a third level of potential proportional to said second level of potential when said first amplifier element is enabled; and
 wherein said amplifier circuit further comprises first gating means for enabling said first DC coupled circuit means and disabling said second DC coupled circuit means in response to a video enable signal representing a first video contrast and second gating means for disabling said first DC coupled circuit means and enabling said second DC coupled circuit means in response to an intensified video enable signal representing a second video contrast.

11. A wide bandwidth amplifier circuit for displaying video alpha-numeric signal information upon a cathode ray tube with continuous gray scale rendition comprising:
 a ramp generator for generating a high frequency sawtooth input signal;
 a pulse width modulator responsive to said high frequency sawtooth input signal and to the video input signal information;
 a first and second transistor amplifier element connected in a complementary symmetrical configuration with each amplifier element having a base, collector and emitter terminal and with the collector terminals connected in common and adapted to be connected to the cathode or grid of the cathode ray tube;
 level shift circuit means coupling the base terminal of said first transistor amplifier element to the output of said pulse width modulator;
 a source of DC potential;
 contrast control means coupling said source of DC potential across said first and second transistor amplifier element; and
 capacitor means for bypassing said source of DC potential at video frequencies.

* * * * *

UNITED STATES PATENT AND TRADEMARK OFFICE
CERTIFICATE OF CORRECTION

PATENT NO. : 4,293,875
DATED : October 6, 1981
INVENTOR(S) : Bernard R. Katz

It is certified that error appears in the above—identified patent and that said Letters Patent is hereby corrected as shown below:

Page 1, The name of the Assignee is mispelled.

The Assignee is the --TELERAM COMMUNICATIONS CORP.--

Signed and Sealed this

Ninth Day of February 1982

[SEAL]

*Attest:*

*Attesting Officer*

GERALD J. MOSSINGHOFF

*Commissioner of Patents and Trademarks*